Oct. 17, 1933.  F. H. STREINE  1,931,362
MEANS FOR CUTTING SHEETS
Filed Aug. 31, 1931

INVENTOR,
Frank H. Streine,
BY Howard S. Smith
His ATTORNEY

Patented Oct. 17, 1933

1,931,362

UNITED STATES PATENT OFFICE 1,931,362

MEANS FOR CUTTING SHEETS

Frank H. Streine, New Bremen, Ohio, assignor to The Streine Tool and Manufacturing Company, New Bremen, Ohio, a corporation of Ohio Application August 31, 1931. Serial No. 560,353

1 Claim. (Cl. 164—66)

This invention relates to new and useful improvements in means for cutting sheets.

The prevailing method of setting slitter cutters is to have an upper cutter and a lower cutter. Since these cutters come into very close contact on the edge, it is necessary that very great precaution be taken so that the cutters will not set close enough to scar each other and at the same time close enough to prevent the formation of a feather edge or burr, which is not acceptable to the trade.

It is the principal object of my invention to avoid the foregoing difficulties by providing means of cutting sheets by means of a cutter roll and an anvil roll. Both or either of these rolls will be driven, or the anvil roll can run idle while the cutter roll alone is driven. The anvil roll can extend the full length of the cutter arbor and both the cutters can be quickly set to any position, thus saving a great deal of time in the cutter set up.

Other important and incidental objects will be brought out in the following specification and particularly set forth in the subjoined claims.

Figure 1:
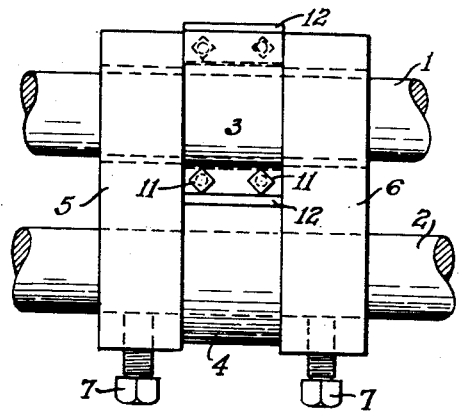
Figure 2:
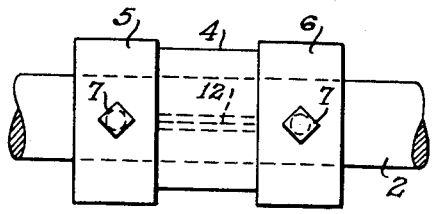

In the accompanying drawing, Figure 1 is a top elevational view of the scrap cutter, showing the guides between which the cutting head and roller are located. Figure 2 is a front elevational view thereof. And Figure 3 is a cross sectional view taken through the same.

Figure 3:
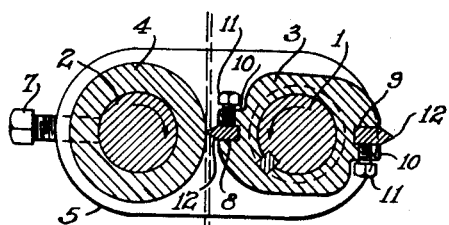

In Figures 1 and 3 of the accompanying drawing, the numeral 1 designates a driven shaft and 2 an idler shaft. Keyed to the driven shaft 1 is a cutting head 3, while a hardened tool steel roller 4 is allowed to rotate freely on the idler shaft 2.

The cutting head 3 and roller 4 are located between two guides 5 and 6 which are free to be moved on the shafts 1 and 2, being held in an adjusted position thereon by set screws 7. (See Figures 1 and 2.) The purpose of these two guides is to keep these two shafts from springing during a cut.

The cutter head 3, which is an oblong member, has curved ends formed with two radial grooves 8 and 9, 180° apart. At one side of each groove the cutter head is offset to provide a shoulder 10. A screw hole projects from each shoulder through its respective end of the cutter head to the radial groove therein, to receive a set screw 11 to adjustably hold a cutter insert 12 in the groove.

In Figure 3 the dotted line designates a piece of scrap being cut between the anvil roller 4 and the cutter head 3 by the insert blades 12, 12 mounted 180° apart on said head. In this construction employing the anvil roller, there is no danger of the cutters being scarred, the formation of feather edges and burrs is prevented, and other difficulties with the prevailing method of setting slitting cutters removed. The guides 5 and 6, which are a pair of bridle castings, prevent the shafts 1 and 2 from springing apart when cutting the material. In this way the cutters can be set up very close to the anvil roll and still have sufficient clearance not to mar it, when cutting any material passed between them.

Having described my invention, I claim:

In a device of the type described for cutting sheets, a pair of axially alined shafts, an anvil roller on one shaft and a cutter on the other shaft, a pair of guides movable along said shafts, and means for holding said guides in an adjusted position with the anvil roller and cutter between them to keep the shafts from springing during a cut.

FRANK H. STREINE.